Patented Oct. 22, 1935

2,018,133

UNITED STATES PATENT OFFICE 2,018,133

MANUFACTURE OF SILICON CARBIDE

Henry P. Kirchner, Niagara Falls, N. Y., assignor to The Carborundum Company, Niagara Falls, N. Y., a corporation of Pennsylvania No Drawing. Application August 2, 1933, Serial No. 683,343

4 Claims. (Cl. 204—62)

This invention relates to an improvement in the manufacture of silicon carbide and particularly to an improved porous mix for use in the producing furnace.

A mixture typical of those heretofore used in the manufacture of silicon carbide consists of sand, 56 per cent; coke, 35 percent; sawdust, 7 per cent; and salt, 2 percent. The coke used is usually petroleum coke which has a relatively small proportion of ash. A fine quartz sand of the character used for the manufacture of a high grade of glass is employed in the manufacture of silicon carbide. The salt tends to reduce the impurities in the resultant product, since it reacts at high temperatures with impurities containing iron and some other elements to form volatile chlorides. In the production of silicon carbide, the heating of the producing furnace is started and maintained by passing electric current through a carbon core. Carbon monoxide is formed in large quantities during the operation of this electric furnace in which the mix described above is heated. It is necessary therefore to provide for the escape of carbon monoxide (and other volatile materials) as evenly and as regularly as possible from the interior of the electric furnace. These gases and vapors are first formed near the core, and have to be dispersed quietly through the mix which surrounds the core. Sawdust has been used for many years to render the furnace mix porous. There are certain disadvantages, however, connected with the use of sawdust for this purpose.

In the first place, sawdust absorbs moisture, due to the spongy nature of this material. This moisture has in the past evaporated during the operation of the electric furnace. The sawdust might be subjected to a preliminary drying treatment, but drying of sawdust in a kiln is difficult. In the second place, particles of sawdust in the outer parts of the furnace mix are incompletely burned, which results in the presence of varying amounts of charcoal in the furnace crust which later becomes part of what is known as the "old mix". Since much of the "old mix" is used along with new mix in the next charge, it is desirable that the "old mix" should be of a rather uniform character. In the third place, commercially obtainable sawdust is not uniform as to size of particles, but on the contrary contains chunks of wood of very varied shapes and sizes. Hence the porosity of the furnace mix varies on this account.

To improve the porosity of the furnace mix and to lessen the disadvantages mentioned above, I use, in accordance with my invention, dry seed hulls instead of sawdust. For example, I employ dry grain hulls, such as buckwheat hulls, which have a number of advantages for the purpose described. These hulls are composed of thin shells which, by reason of their convex shapes, make a relatively fluffy mass, so that a given volume of buckwheat hulls has about 75 per cent of the weight of ordinary sawdust under the same pressure conditions. Grain hulls, being formed of thin scales which are somewhat glazed, do not absorb water so readily as sawdust, and are more easily dried in a kiln for example. Grain hulls can be obtained which are quite uniform in character, in contrast to the lack of uniformity of the ordinary sawdust commercially obtainable.

A buckwheat hull, when flattened (by pressure between two panes of glass for example), covers a surface which is approximately elliptical, but which has the ends pointed at the termini of the major axis. The major axis is about 5 millimeters long and the minor axis is about 4.3 millimeters in length. The thickness is of the order of magnitude of .15–.2 millimeter. Each hull is bent in such a way that the minor axis remains approximately straight while the major axis is curved. The displacement of the ends of such a dried hull, measured from a plane which is tangent to the minor axis, is 1 to 2 millimeters. The dried hulls are quite resilient.

Dried sawdust contains a larger percentage of volatile carbonaceous matter than dried seed hulls which I have tested.

Peanut hulls show, on analysis, percentages of fixed carbon and volatile carbonaceous matter which are of the same order of magnitude as those of buckwheat hulls. The apparent density of peanut hulls at atmospheric pressure is, however, only about one fourth of that of the sawdust with which it was compared. Peanut hulls are therefore adapted to allow the ready escape of volatile matter in the early part of the electric furnace process.

It follows, from these properties of seed hulls, that a fluffier and more porous furnace mix can be made by adding such hulls to the sand carbon furnace mix than can be obtained with the use of the ordinary sawdust of commerce mentioned above. The furnace mix obtained with grain hulls is, moreover, more uniform in character and there is less organic matter contained in a given volume of the mix ready for burning than is the case when sawdust is used.

I have employed furnace mixtures including grain hulls in the place of sawdust in producing silicon carbide, and its use has shown a decided improvement in the furnacing operations necessary to produce silicon carbide.

Other grain hulls may be used instead of buckwheat hulls, more especially if they have curved shapes and are similarly resilient. Such grain hulls as have a thickness which is small as compared with their length and breadth are particularly advantageous.

The improvement described in detail above is particularly adapted for improving an electric furnace charge used in the manufacture of silicon carbide, but the improvement is also applicable in the preparation of other mixes where a carbonaceous ingredient of similar physical and chemical characteristics is desired.

The principal advantages of grain hulls for use in preparing electric furnace mixes in the manufacture of silicon carbide may be summarized as follows:

1—A smaller mass of hulls is necessary as compared with the sawdust usually employed.

2—Grain or nut hulls cost less than sawdust in certain regions where the supply of the former is plentiful. In this connection the ease with which the hulls can be dried in a kiln should be considered, the sawdust being more difficult to dry because of the water held in pores of the wood.

3—The remarkable uniformity in area of buckwheat hulls which have been subjected to similar treatment contributes to uniformity of conditions in the furnace charge and renders their use particularly advantageous.

4—There is less volatile carbonaceous matter in grain hulls than in sawdust.

These advantages will be appreciated by those skilled in the particular electric furnace art referred to above. The principal features for which patent protection is desired are defined in the following claims.

I claim:

1. A raw batch for the manufacture of silicon carbide in an electric furnace, said batch containing, in addition to sand, carbon and salt, a small proportion of buckwheat hulls.

2. In the manufacture of silicon carbide, the step of highly heating a mixture of sand, coke and salt rendered porous for the evolution of gaseous reaction products by a small proportion of seed hulls.

3. The step in the method of compounding an electric furnace mix requiring ventilation in the earlier stages of furnace operation, which step comprises introducing into the mix a small proportion of buckwheat hulls.

4. A raw batch for the manufacture of silicon carbide in an electric furnace, said batch containing in addition to sand, carbon and salt, a small proportion of seed hulls having curved shapes in which the length and breadth are large as compared with the thickness.

HENRY P. KIRCHNER.